United States Patent
Luke et al.

(10) Patent No.: US 8,886,252 B2
(45) Date of Patent: Nov. 11, 2014

(54) METHOD AND APPARATUS FOR AUTOMATICALLY CHANGING OPERATING MODES IN A MOBILE DEVICE

(75) Inventors: Hok-Sum H. Luke, Bellevue, WA (US); Yu-Chuan Chen, Taoyuan (TW); Yuan-Mao Tsuei, Taoyuan (TW); Wen-Chi Chang, Taoyuan (TW); Yih-Feng Kao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 682 days.

(21) Appl. No.: 12/371,477

(22) Filed: Feb. 13, 2009

(65) Prior Publication Data

US 2010/0159998 A1 Jun. 24, 2010

Related U.S. Application Data

(63) Continuation-in-part of application No. 12/346,770, filed on Dec. 30, 2008, now Pat. No. 8,213,999.

(51) Int. Cl.
*H04M 1/00* (2006.01)
*H04M 1/725* (2006.01)
*H04M 1/60* (2006.01)
*H04M 19/04* (2006.01)

(52) U.S. Cl.
CPC ........ *H04M 1/72563* (2013.01); *H04M 1/6041* (2013.01); *H04M 19/04* (2013.01); *H04M 2250/68* (2013.01)
USPC ...................... 455/550.1; 455/567; 455/575.1

(58) Field of Classification Search
CPC ............ H04M 19/04; H04M 1/72519; H04M 19/041; H04M 19/047; H04M 1/57; H04M 1/0214; H04M 1/23; H04M 1/13883; H04M 1/0247; H04M 1/72522; H04M 2250/12
USPC .......... 455/569.1–569.2, 556.1–556.2, 550.1, 455/566–567, 575.1, 418
See application file for complete search history.

(56) References Cited

U.S. PATENT DOCUMENTS

| | | | |
|---|---|---|---|
| 5,633,484 A | 5/1997 | Zanch et al. | |
| 6,408,178 B1 | 6/2002 | Wickstrom et al. | |
| 7,302,280 B2 * | 11/2007 | Hinckley et al. | ............... 455/567 |
| 7,310,540 B2 * | 12/2007 | Meins et al. | ............... 455/575.1 |
| 8,213,999 B2 | 7/2012 | Luke et al. | |

(Continued)

FOREIGN PATENT DOCUMENTS

| | | |
|---|---|---|
| CN | 1372752 A | 10/2002 |
| CN | 1744616 A | 3/2006 |

(Continued)

OTHER PUBLICATIONS

Partial European Search Report for Application No. 09161365.3; Applicant: HTC Corporation; Date of Mailing: Sep. 17, 2009 (2 pages).

*Primary Examiner* — Golam Sorowar
(74) *Attorney, Agent, or Firm* — Perkins Coie LLP (57) ABSTRACT

A method and system for automatically changing the operating mode of a mobile device in response to changes in positioning or the use of the device includes multiple sensors that provide information relating to the mobile device and its environment. The sensors determine positioning information, incident light intensity, and object proximity and detect the presence of a pointer device. The system monitors the sensors and applications executed by the operating system. Based on the monitoring, the system changes the operating mode of the mobile device.

40 Claims, 8 Drawing Sheets

(56) References Cited

U.S. PATENT DOCUMENTS

| | | |
|---|---|---|
| 2002/0010008 A1* | 1/2002 | Bork et al. .................... 455/567 |
| 2002/0021278 A1 | 2/2002 | Hinckley et al. |
| 2002/0173345 A1* | 11/2002 | Swerup et al. ................ 455/566 |
| 2004/0051700 A1* | 3/2004 | Pensjo ......................... 345/173 |
| 2004/0127198 A1* | 7/2004 | Roskind et al. ............ 455/412.2 |
| 2004/0133817 A1 | 7/2004 | Choi |
| 2004/0169674 A1* | 9/2004 | Linjama ....................... 345/702 |
| 2004/0259536 A1 | 12/2004 | Keskar et al. |
| 2005/0210417 A1* | 9/2005 | Marvit et al. ................. 715/863 |
| 2006/0116175 A1* | 6/2006 | Chu .............................. 455/567 |
| 2006/0129600 A1* | 6/2006 | Ode ............................. 707/104.1 |
| 2006/0240866 A1 | 10/2006 | Eilts |
| 2007/0004451 A1* | 1/2007 | Anderson .................. 455/556.1 |
| 2007/0036348 A1* | 2/2007 | Orr ................................ 379/424 |
| 2007/0075965 A1* | 4/2007 | Huppi et al. ................. 345/156 |
| 2007/0287491 A1* | 12/2007 | Cradick et al. ............. 455/550.1 |
| 2008/0146289 A1* | 6/2008 | Korneluk et al. ........... 455/569.1 |
| 2009/0015425 A1* | 1/2009 | Palmqvist et al. .......... 340/686.6 |
| 2009/0117888 A1* | 5/2009 | Taylor et al. ................. 455/418 |
| 2009/0138736 A1 | 5/2009 | Chin |
| 2009/0209293 A1* | 8/2009 | Louch ........................... 455/566 |
| 2009/0275307 A1* | 11/2009 | Kahn .......................... 455/404.1 |
| 2010/0069115 A1* | 3/2010 | Liu ............................. 455/556.1 |
| 2010/0075712 A1* | 3/2010 | Sethuraman et al. ...... 455/556.1 |
| 2010/0159998 A1 | 6/2010 | Luke et al. |

FOREIGN PATENT DOCUMENTS

| | | |
|---|---|---|
| JP | 2008160753 A * | 7/2008 |
| WO | WO-200605770 A2 | 1/2006 |
| WO | WO-2008075082 A1 | 6/2008 |

* cited by examiner

METHOD AND APPARATUS FOR AUTOMATICALLY CHANGING OPERATING MODES IN A MOBILE DEVICE

CROSS-REFERENCE TO RELATED APPLICATION(S)

The present application is a continuation-in-part of U.S. patent application Ser. No. 12/346,770, entitled "CONTROLLING METHOD AND SYSTEM FOR HANDHELD COMMUNICATION DEVICE AND RECORDING MEDIUM USING THE SAME," filed on Dec. 31, 2008, which is assigned to the same assignee as the present application and is hereby incorporated by reference. U.S. patent application Ser. No. 12/346,770 claims priority to Taiwan Application No. 097150126, filed Dec. 22, 2008, which is hereby incorporated by reference.

BACKGROUND

As mobile technology improves, mobile devices have become smaller and more powerful. The wireless networks they connect to have improved, as well. These improvements now enable mobile devices to connect to networks for many functions beyond simple voice calling. For example, they can be used to send e-mail, browse the Internet, and send instant messages. Many devices also include a global positioning system (GPS) receiver with integrated mapping (or maps downloaded from a network). In some cases, the mobile devices support wireless standards providing local connectivity, such as Bluetooth or IEEE802.11. These standards can enable the device to connect to a wireless local area network (WLAN) or even communicate with other mobile devices in a peer-to-peer mode. Unfortunately, usability has not kept pace with these increased capabilities. As technology improves, it would be useful to have methods for automating common tasks to enable mobile devices to better make use of the increased capabilities.

DETAILED DESCRIPTION

A method and system for automatically changing the operating mode of a mobile device in response to changes in the positioning or the use of the device is disclosed (hereinafter referred to as the "mode changing system" or the "system"). The mobile device includes multiple sensors that provide information relating to the mobile device and its environment, such as positioning information, intensity of incident light, and object proximity. The system monitors the sensors and applications executed by the operating system. Based on the monitoring, the system changes the operating mode of the mobile device.

In one configuration, the system monitors the mobile device during an incoming call. If the system detects an object in front of the device during the incoming call, it changes the operating mode by temporarily muting the ringer component or changing the device to a silent mode or a vibrate-only mode. Similarly, during a telephone call, the system may detect if the mobile device is moved to a position faced downward. In response, the system may automatically change the mode of the mobile device from a standard telephone operating mode to a speakerphone mode. The mobile device may also automatically change the operating mode in response to certain types of user interaction, such as when a user activates a mobile application or removes a pointer device from a holder associated with the mobile device.

Various embodiments of the application will now be described. The following description provides specific details for a thorough understanding and an enabling description of these embodiments. One skilled in the art will understand, however, that the application may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the application.

Figure 1:
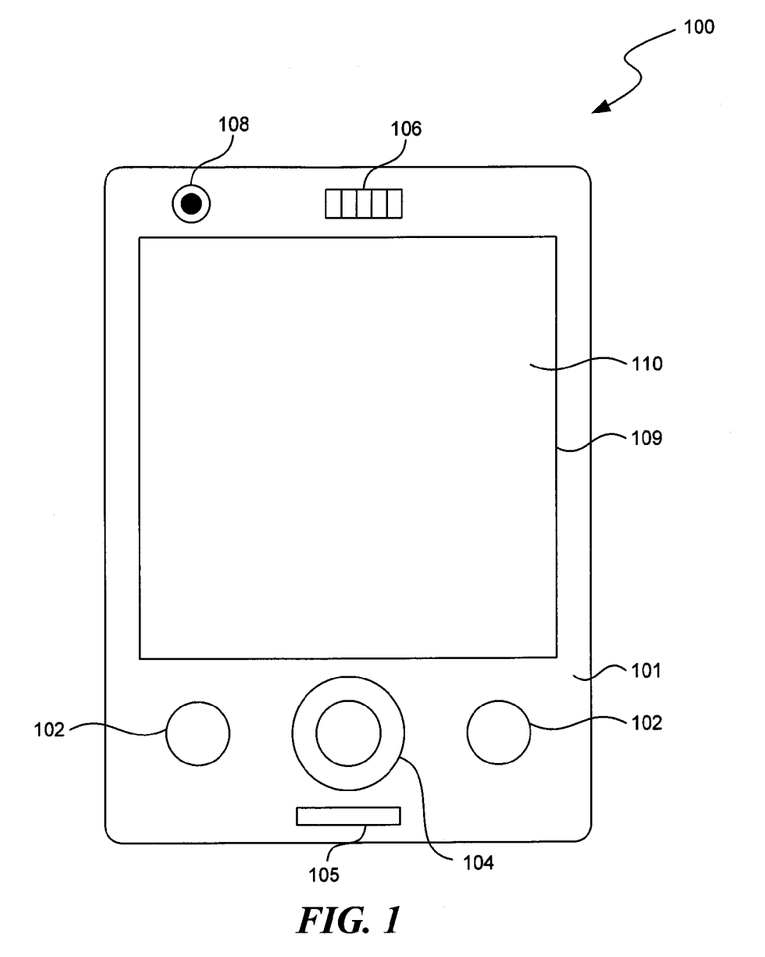
FIG. 1 is a front view of a mobile device suitable for implementing a mode changing system.

FIG. 1 is a front view of a mobile device 100 suitable for implementing a mode changing system. As shown in FIG. 1, the mobile device 100 may include a housing 101, a plurality of push buttons 102, a directional keypad 104 (e.g., a five-way key), a microphone 105, a speaker 106, and a display 110 carried by the housing 101. The mobile device 100 may also include other microphones, transceivers, photo sensors, and/or other computing components generally found in PDA phones, cellular phones, smartphones, or other mobile communication devices.

The display 110 may include a liquid-crystal display (LCD), a plasma display, a vacuum fluorescent display, a light-emitting diode (LED) display, a field emission display, and/or other suitable types of display configured to present a user interface. The mobile device 100 may also include a touch sensing component 109 configured to receive input from a user. For example, the touch sensing component 109 may include a resistive, capacitive, infrared, surface acoustic wave (SAW), and/or another type of touch screen. The touch sensing component 109 may be integrated with the display 110 or may be independent from the display 110. In the illustrated embodiment, the touch sensing component 109 and the display 110 have generally similar sized access areas. In other embodiments, the touch sensing component 109 and the display 110 may have different sized access areas. For example, the touch sensing component 109 may have an access area that extends beyond a boundary of the display 110.

The mobile device 100 may also include a camera 108 suitable for taking pictures or recording video. The camera 108 includes an optical image sensor and a lens, and may also have a flash associated with it for taking pictures in low-light conditions. Although the camera 108 is shown on the front face of the mobile device 100, the camera 108 could also be located on the rear face of the device. Alternatively, the mobile device 100 might be configured with multiple cameras, such as with a first camera on the front face and a second camera on the back face.

In certain embodiments, in addition to or in lieu of the camera 108 and the touch sensing component 109, the mobile device 100 can also include sensor components such as a pressure sensor, a temperature sensor, and/or other types of sensors (not shown) independent from or integrated into the display 110. For example, the mobile device 100 can include a thermocouple, a resistive temperature detector, and/or other types of temperature sensors proximate to the display 110 for measuring a temperature of an input mechanism, the display 110, and/or the touch sensing component 109.

The mobile device 100 may also include one or more sensors for receiving information about the environment nearby the device. The mobile device 100 may include a light sensor configured to detect a level of intensity of light incident to the mobile device. The light sensor may be located, for example, behind the display 100, such that the light sensor can determine the intensity of light incident on the display 100. The mobile device 100 may also include a proximity sensor configured to detect objects in proximity to the mobile device 100 without the objects making physical contact with the mobile device 100. The proximity sensor may detect objects by emitting an electrostatic or electromagnetic field and monitoring the behavior of the generated field over a period of time. Thus, an object near the device will change the generated field as the object approaches the proximity sensor. The mobile device 100 may also include a positioning sensor configured to provide information about the position and orientation of the mobile device 100. The positioning sensor may be, for example, a G sensor (or other sensor using one or more accelerometers) configured to determine the current orientation of the mobile device, such as whether the device is being held in a portrait or landscape position.

Figure 2:
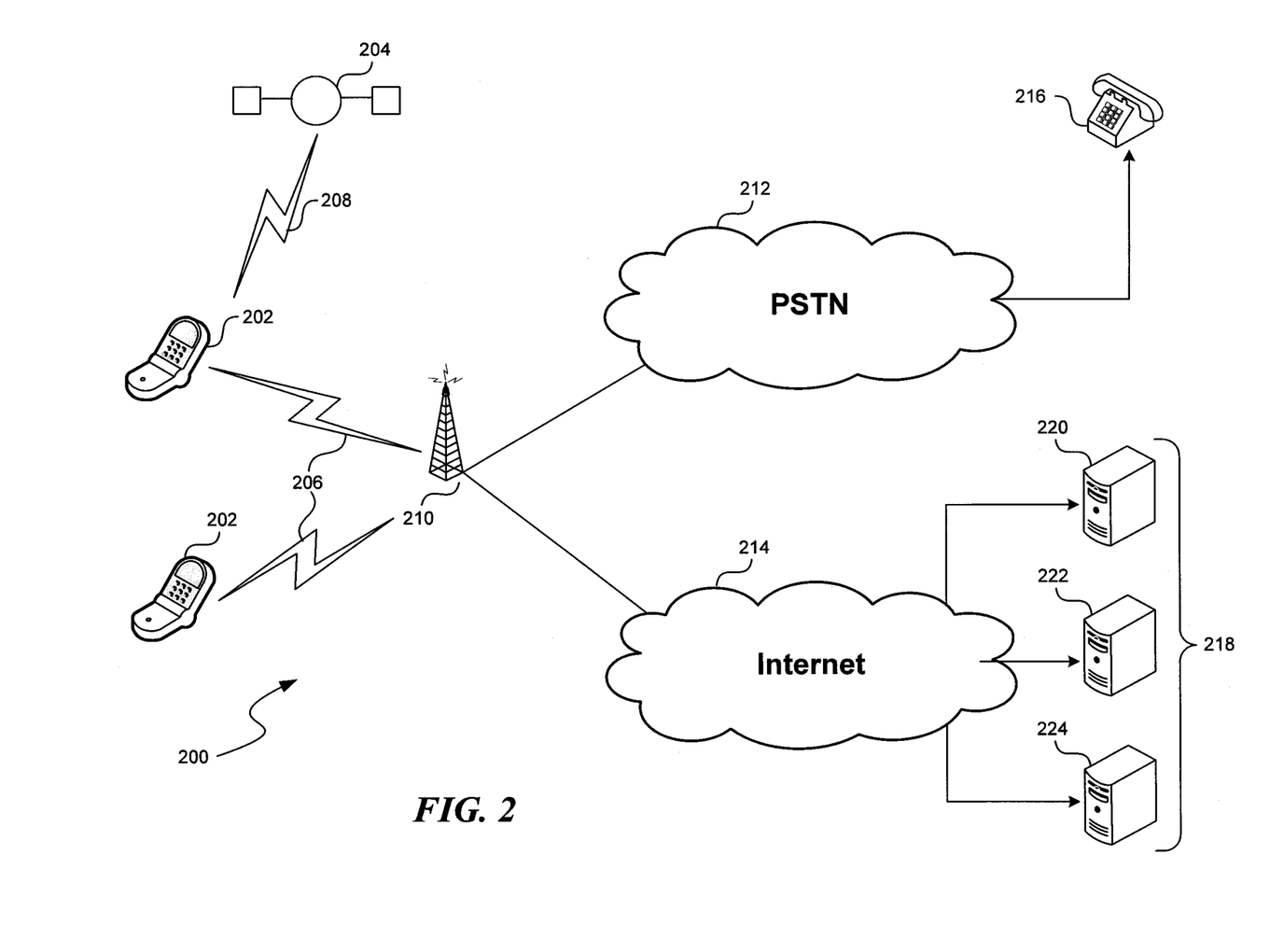
FIG. 2 is a network diagram of a representative environment in which the mode changing system operates.

FIG. 2 is a network diagram of a representative environment 200 in which the mode changing system operates. A plurality of mobile devices 202 roam in an area covered by a wireless network. The mobile devices are, for example, cellular phones or mobile Internet devices, such as the mobile device 100 shown in FIG. 1. The mobile devices 202 communicate to a cellular transceiver 210 through wireless connections 206. The wireless connections 206 could be implemented using any system for transmitting digital data. For example, the connection could use a cellular network implementing GSM, UMTS, or CDMA2000 or a non-cellular network implementing WiFi (IEEE 802.11) or Bluetooth. Although wireless connections are most common for these mobile devices, the devices may also communicate using a wired connection such as Ethernet.

In some configurations, a mobile device 202 may also have a GPS receiver embedded in it to provide location information. In these configurations, the mobile device 202 also receives a location signal 208 from one or more GPS satellites 204. For clarity, the figure only shows one satellite. However, a GPS receiver generally requires several satellites in order to determine its location. Alternatively or additionally, the cellular transceiver 210 may, with assistance from the mobile device 202, employ known signal triangulation and/or signal delay techniques to determine a location for each wireless device.

The cellular transceiver 210 is connected to one or more networks that provide backhaul service for the wireless network. The cellular transceiver 210 is connected to the Public-Switched Telephone Network (PSTN) 212, which provides a connection between the mobile network and a remote telephone 216 on another network. When the user of the mobile device 202 makes a voice telephone call, the cellular transceiver 210 routes the call through the wireless network's voice backhaul (not shown) to the PSTN 212. The PSTN 212 then automatically connects the call to the remote telephone 216. If the remote telephone 216 is another mobile device, the call is routed through a second wireless network backhaul to another cellular transceiver.

The cellular transceiver 210 is also connected to the Internet 214, which provides a packet-based connection to remote devices 218, which support network applications. When the user of the mobile device 202 communicates through a data connection, the cellular transceiver 210 routes the packet data through the wireless network's data backhaul (not shown) to the Internet 214 (or another packet-based network). The Internet 214 connects the wireless network to remote devices 218, which includes an e-mail server 220, a web server 222, and an instant messenger server 224. Of course, the remote devices 218 may include any application available over the Internet, such as a file transfer protocol (FTP) server or a streaming media server.

Figure 3:
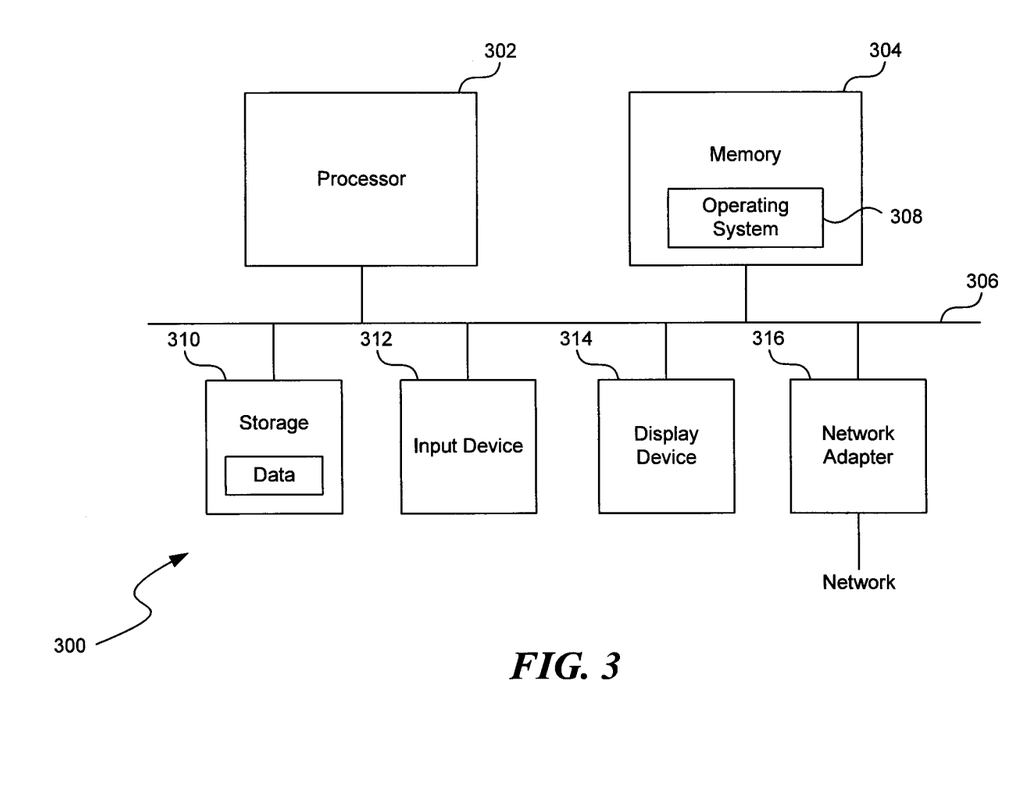
FIG. 3 is a high-level block diagram showing an example of the architecture of a mobile device.

FIG. 3 is a high-level block diagram showing an example of the architecture of a mobile device 300. The mobile device 300 may represent a mobile device 202 of FIG. 2.

The mobile device 300 includes processor(s) 302 and a memory 304 coupled to an interconnect 306. The interconnect 306 shown in FIG. 3 is an abstraction that represents any one or more separate physical buses, point-to-point connections, or both, connected by appropriate bridges, adapters, or controllers. The interconnect 306, therefore, may include, for example, a system bus, a Peripheral Component Interconnect (PCI) family bus, a HyperTransport or Industry Standard Architecture (ISA) bus, a Small Computer System Interface (SCSI) bus, a Universal Serial Bus (USB), IIC (I2C) bus, or an Institute of Electrical and Electronics Engineers (IEEE) standard 1394 bus, sometimes referred to as "Firewire."

The processor(s) 302 may include central processing units (CPUs) of the mobile device 300 and, thus, control the overall operation of the mobile device 300. In certain embodiments, the processor(s) 302 accomplish this by executing software or firmware stored in the memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is, or includes, the main memory of the mobile device 300. The memory 304 represents any form of fixed or removable random access memory (RAM), read-only memory (ROM), flash memory, or the like, or a combination of such devices. In use, the memory 304 stores, among other things, an operating system 308 of the mobile device 300.

The mobile device 300 includes an input device 312, which enables a user to control the device. The input device 312 may include a keyboard, trackpad, touch-sensitive screen, or other standard computer input device. The mobile device 300 also includes a display device 314 suitable for displaying a user interface, such as the display 110 (FIG. 1). The network adapter 316 provides the mobile device 300 with the ability to communicate with remote devices over a network and may be, for example, a wireless adapter. The mobile device 300 may further include local storage 310 coupled to the interconnect 306. The local storage 310 may include, for example, a flash memory device configured to provide mass storage.

Figure 4A:
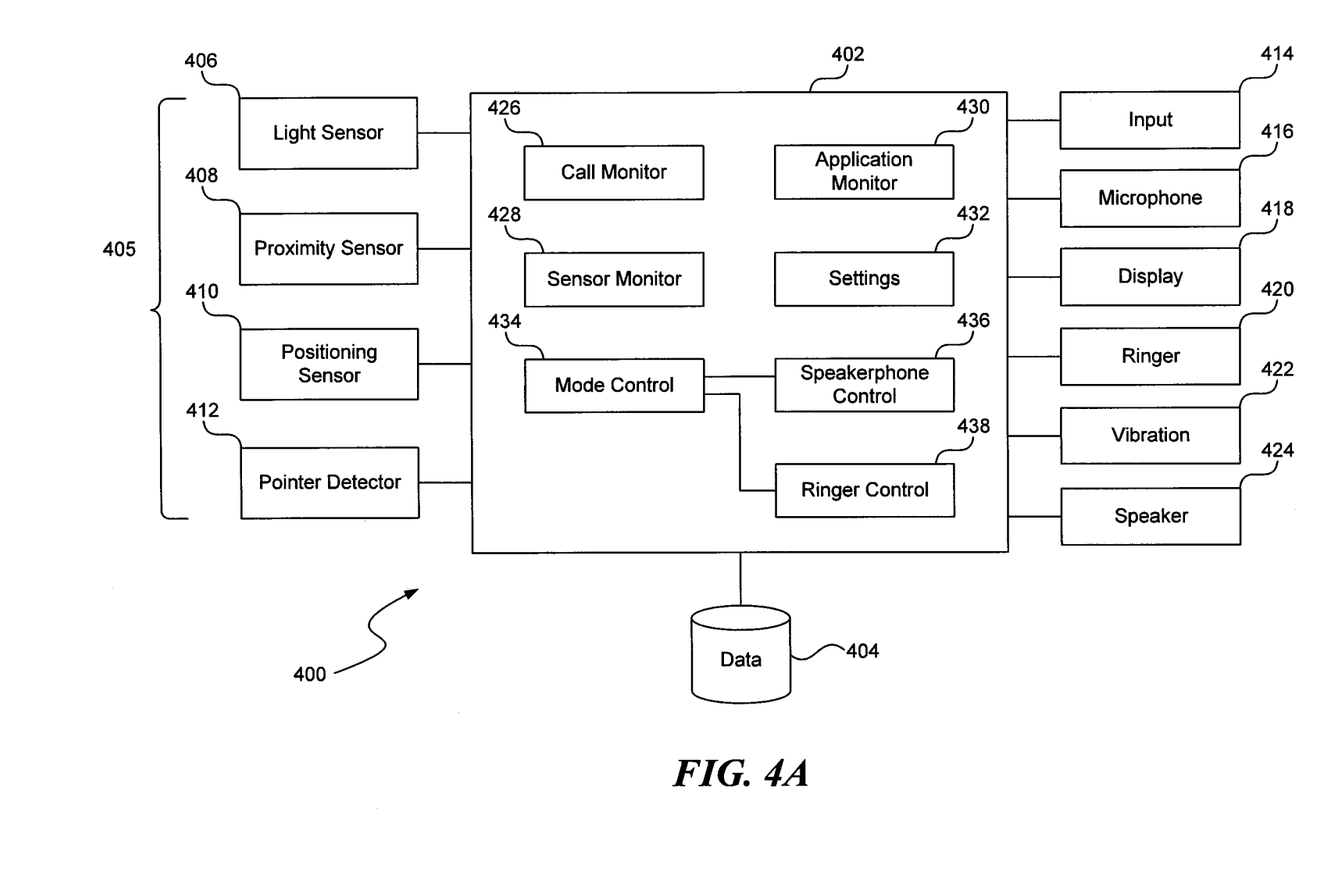
FIG. 4A is a logical block diagram of the mode changing system.

FIG. 4A is a logical block diagram of a mode changing system 400. The system 400 may be executed, for example, using the memory and processor(s) of FIG. 3. Although the various modules are depicted in a single device, the modules are not necessarily physically collocated. In some embodiments the various modules may be distributed over multiple physical devices. Similarly, the data storage could be implemented using local storage components, such as a hard drive or flash memory, or using remote storage, such as a web server accessible through the Internet. The code to support the functionality of this system may be stored on a computer readable medium such as an optical drive, flash memory, or a hard drive. Aspects of the system 400 may be implemented as software, firmware, hardware, or as a combination of these.

The system 400 includes a processing component 402, which is configured to monitor sensor data and change the mode of the mobile device based on changes detected in the sensor data. The processing component 402 is connected to a data storage component 404, which stores configuration and settings information related to the system 400. The stored information may include, for example, evaluation thresholds and information defining the changes to implement when the system changes the mode of the device.

The processing component 402 is connected to multiple sensor components 405. The sensor components 405 include a light sensor 406, which is configured to detect a level of light incident on the mobile device. The light sensor 406 may be a dedicated light intensity sensor or may use light intensity data received from a camera component (e.g., the camera 108 of FIG. 1). The processing component 402 is also connected to a proximity sensor 408, which is configured to detect objects that are near the mobile device but not within physical contact. The processing component 402 is also connected to a positioning sensor 410. The positioning sensor 410 uses acceleration information or other location information to determine a current position or orientation of the mobile device. The positioning sensor 410 may include, for example, one or more accelerometers configured to determine the direction of acceleration due to gravity. Thus, when the device is at rest (i.e., in the absence of other acceleration), the positioning sensor 410 provides data that can be used to determine which direction the front of the device is facing.

Figure 4B:
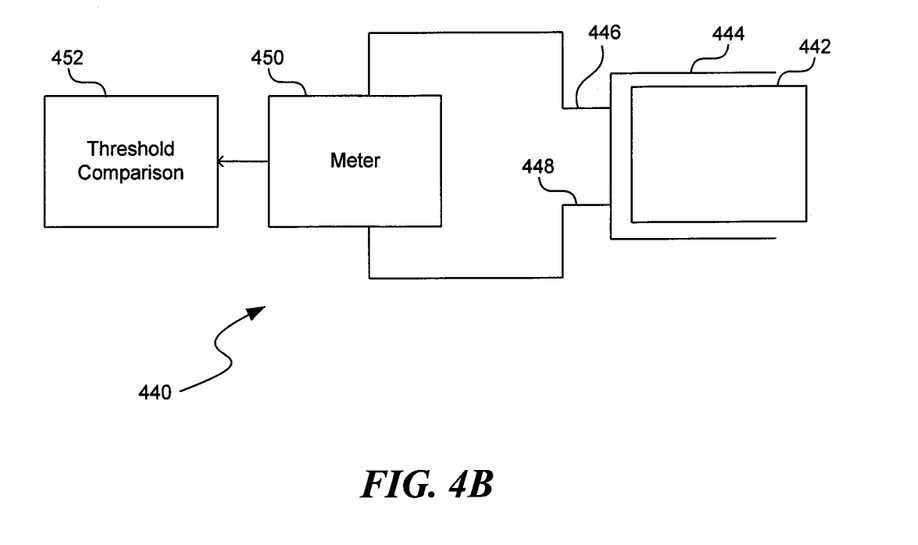
FIG. 4B illustrates a circuit suitable for using electrical characteristics to detect that a pointer module is present.

The sensor components 405 also include a pointer detector sensor 412, which is configured to detect a pointer device (e.g., a stylus) in a holder associated with the mobile device. The pointer detector sensor 412 may use any method known in the art to detect the pointer device. For example, FIG. 4B illustrates a simple circuit 440 suitable for using electrical characteristics to detect when a pointer device is present, although more complex detectors may be employed. Two wires 446 and 448 are electrically connected to a pointer device holder 444. The wires 446 and 448 are connected so that when a pointer device 442 is inserted into the pointer device holder 444, an electrical circuit is formed connecting wire 446 to wire 448. The wires 446 and 448 are connected to a meter 450, which is configured to measure the resistance, capacitance, inductance, or other impedance in the circuit including wires 446 and 448. If the pointer device holder 444 does not contain the pointer device 442, the meter 450 will detect an infinite resistance (or alternatively, a high capacitance). If a pointer device is present, the meter 450 will detect a measurable resistance (or a much smaller capacitance). The meter 450 provides the measured value to a threshold comparison component 452, which compares the measured value to a threshold value. The threshold comparison component 452 then determines that a pointer device 442 is inserted when the measured value surpasses the threshold value. The threshold comparison component 452 can be configured with thresholds that are determined theoretically or experimentally. Of course, the circuit 440 can also be configured to use a combination of resistance, capacitance, inductance, or other impedance to detect the pointer device 442.

Figure 4C:
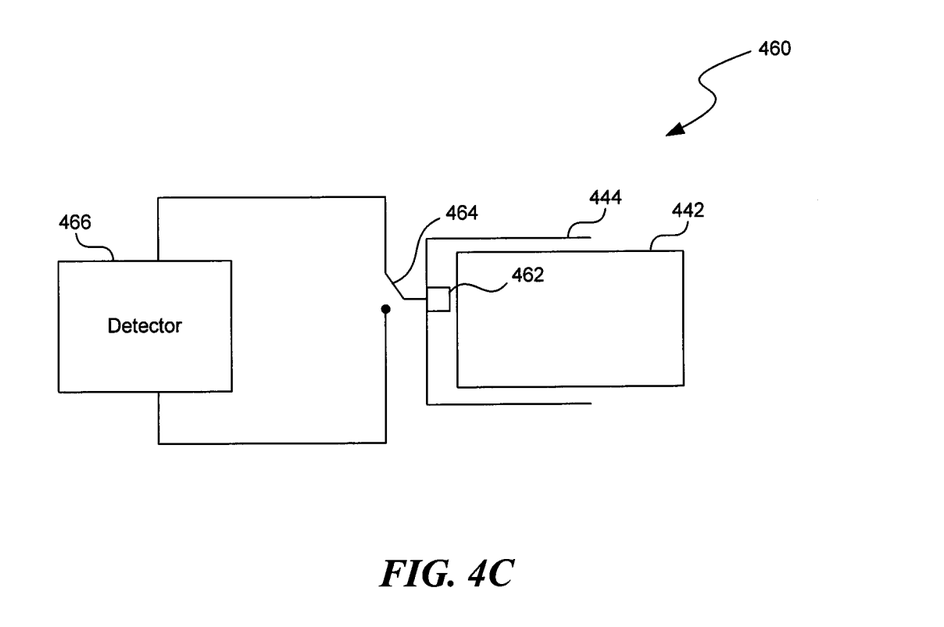
FIG. 4C illustrates a circuit suitable for using mechanical characteristics to detect that a pointer device is present.

Alternatively, FIG. 4C illustrates a circuit 460 suitable for using mechanical characteristics to detect that a pointer device is present. The pointer device holder 444 includes a button 462 or similar mechanical component connected to a mechanical or electromechanical switch 464. The switch 464 is connected to the terminals of a detector 466. When the pointer device 442 is not present, the switch 464 is open and no current can flow between the terminals of the detector 466. When the pointer device 442 is inserted, it presses the button 462, which closes the switch 464 and creates a closed circuit between the terminals. Thus, the detector 466 determines that the pointer device 442 is inserted when the circuit is closed.

Returning to FIG. 4A, the processing component 402 is also connected to multiple input and output components. In particular, the processing component 402 is connected to an input component 414, which is configured to receive control input from the user. The input component 414 may include, for example, a touch sensitive screen or a hardware keyboard. The processing component 402 is also connected to a microphone 416, which is configured to receive sound from the environment, such as a user's voice. The microphone 416 may provide variable sensitivity that can be controlled by the processing component 402. The system 400 also includes a display component 418 (e.g. the display 110 of FIG. 1), which is configured to display output from the system. The system 400 also includes a ringer component 420 and a vibration component 422, which provide notifications to the user of incoming calls, new messages, etc. The system also includes a speaker component 424, which outputs sound produced by the mobile device. The system may control the speaker component 424 to produce multiple volume levels. The mobile device may also include multiple speakers suitable for use in different configurations. For example, the mobile device may provide a lower-volume speaker suitable for use when the device is operating in a standard telephone mode and a higher-volume speaker suitable for use when the device is operating in a speakerphone mode.

The processing component 402 includes a call monitor component 426, which is configured to monitor the status of telephone calls made by the mobile device. For example, the call monitor component 426 may determine when a new telephone call has been received from a remote device or when a new telephone call has been initiated by the mobile device. The call monitor component 426 may also monitor the device to determine whether the device is participating in an ongoing telephone call and whether a telephone call has been terminated. The call monitor component 426 may determine the status information by periodically polling the device to determine current call status or by receiving event notifications (e.g., hardware or software interrupts) providing status information.

The processing component 402 includes a sensor monitor component 428, which is configured to receive and aggregate information received from the sensor components 405. As discussed below with reference to FIGS. 5-7, the sensor monitor component 428 evaluates the sensor data and initiates changes to the mobile device's operating mode based on the results of the evaluation. The processing component 402 also includes an application monitor component 430, which is configured to similarly monitor software applications that are executed by the mobile device. The application monitor component 430 may detect when the mobile device launches or terminates particular applications. The application monitor component 430 may also detect when the user executes a specific function within a selected application. The application monitor component 430 may then initiate changes to the mobile device's operating mode based on the application information. The application monitor component 430 monitors applications by polling the operating system or by receiving event notifications from the operating system when an application is activated or terminated. The processing component 402 also includes a settings component 432, which is configured to manage system settings.

The processing component 402 includes a mode control component 434, which is configured to execute changes to the mobile device's operating mode as directed by the sensor monitor component 428 or the application monitor component 430. The specific changes to be executed may be configured according to settings that are stored by the settings component 432. The mode control component 434 interfaces with various hardware and software components in order to execute changes to the mobile device's operating mode. For example, the mode control component 434 may direct a speakerphone control component 436 to enable or disable the speakerphone mode of the mobile device. Controlling the speakerphone mode may include disabling the lower-volume speaker used during standard telephone mode and enabling a higher-volume speaker suitable for use when the user is farther away from the speaker. Alternatively, the speakerphone control component 436 may change the volume of a selected speaker or increase the sensitivity of the microphone 416. The mode control component 434 may also direct a ringer control component 438 to change the mode of the ringer component 420 and the vibration component 422. This may include, for example, temporarily muting the ringer component 420 or changing the device to a silent mode (by deactivating the ringer component 420) or a vibrate-only mode (by deactivating the ringer component 420 and enabling the vibration component 422).

Figure 5:
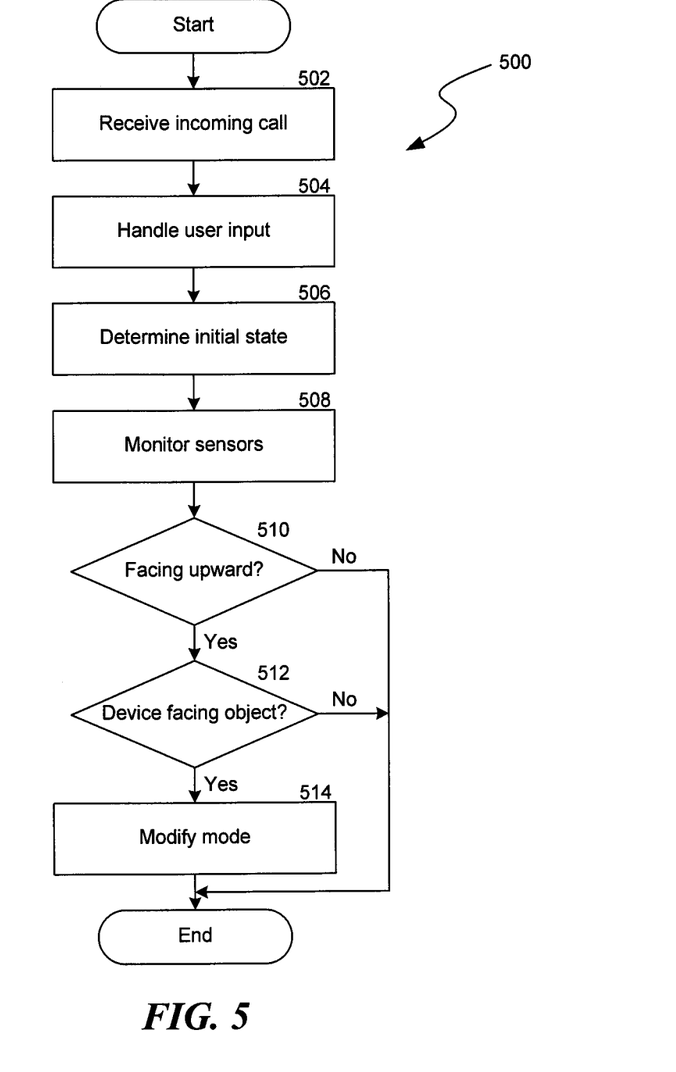
FIG. 5 is a flowchart of a process for automatically modifying the operating mode of the mobile device when an incoming call is received.

FIG. 5 is a flowchart of a process 500 for automatically modifying the operating mode of the mobile device when an incoming call is received. The process 500 begins in block 502, where the call monitor component 426 detects that the mobile device is receiving an incoming telephone call. In response to receiving the incoming call, the mobile device provides a user notification, such as an audible notification or a vibration. The system then proceeds to block 504, where it handles user input. This may include, for example, the user providing a command to answer, mute, or ignore the incoming call.

Processing then proceeds to block 506, where the sensor monitor component 428 determines the initial state of the device. The system determines the initial state by receiving data from one or more of the sensor components 405. The initial state is used as a baseline for later comparison in order to detect changes. The processing in block 506 may include determining the initial position of the device based on the positioning sensor 410. The system may also determine the initial level of light incident to the device (using the light sensor 406) and detect objects already in proximity to the mobile device (using the proximity sensor 408).

After determining the initial state of the device, processing proceeds to block 508, where the system monitors the sensor components 405. During the monitoring step, the system compares data from the sensor components 405 to the initial state that was determined in step 506. This may include comparing current positioning information to the initial positioning information in order to detect a change in the device's position. The system may also compare current incident light intensity to the initial light intensity to detect a change in brightness of incident light that may indicate, for example, that an object has moved between the mobile device and the light source. Similarly, the system may compare current proximity information to the initial proximity information to detect if a new object has moved into proximity to the mobile device.

The system then proceeds to decision block 510, where it determines if the device has moved to a position facing upward. This may be used, for example, to detect if the device has been placed face-up on a desk or table. In one implementation, the system may determine that the device has moved to an upward-facing position when the initial positioning information indicated that the device was facing in another direction (e.g., downward) and the current positioning information indicates that the device is facing upward. In particular, the system may use accelerometers or a G sensor to detect changes in the orientation of the mobile device indicating whether the device has changed to facing upward. Alternatively, the system may be configured simply to determine if the device is currently in an upward-facing position, regardless of the initial position.

If the system determines that the device is in an upward-facing position (or has moved to an upward-facing position), processing proceeds to decision block 512, where the system determines if the device has moved to face toward an object (e.g., a table, a user's hand, etc.). If the device is placed facing an object (or an object is moved to be in proximity of the front of the device), the system may infer that the user intends to ignore the incoming call. In some implementations, the system uses the proximity sensor to detect an object near the device and compares the proximity data to the initial proximity data to determine if the object was placed in proximity after the telephone call was received. Alternatively, the system may use the light sensor to detect an object by comparing the initial incident light intensity to the incident light intensity at a later time. If the intensity drops by a significant amount, the system may then determine that the device is facing toward an object. The system may be configured with various thresholds to configure object detection. For example, the system may include a threshold where an object is detected if the intensity of incident light drops by over 50 percent.

If the system determined in block 510 that the device had not been moved to face upward or if the system determined in block 512 that the device was not facing an object, the system then determines that the operating mode of the mobile device does not need to be modified and the process 500 ends. Otherwise, processing proceeds to block 514, where the system changes the device's operating mode. In particular, the system may be configured to infer from the sensor data that the user does not want to receive the incoming telephone call. In response, the system reduces the attention drawn by the mobile device by, for example, muting the ringer component 420 of the mobile device. Alternatively, the system may change the operating mode of the device to a silent mode or a vibrate-only mode.

In an alternate configuration, the system may be configured to change the operating mode based only on the second test in decision block 512. In this configuration, the system changes the operating mode when an object is placed in proximity to the front of the mobile device, even if the device is not facing downward. In this configuration, a user may change the operating mode when a call is received by simply placing a hand or an object in front of the mobile device. The system may also be configured to detect other positions of the device in decision block 510. For example, the system may instead determine if the mobile device has moved to face downward.

Figure 6:
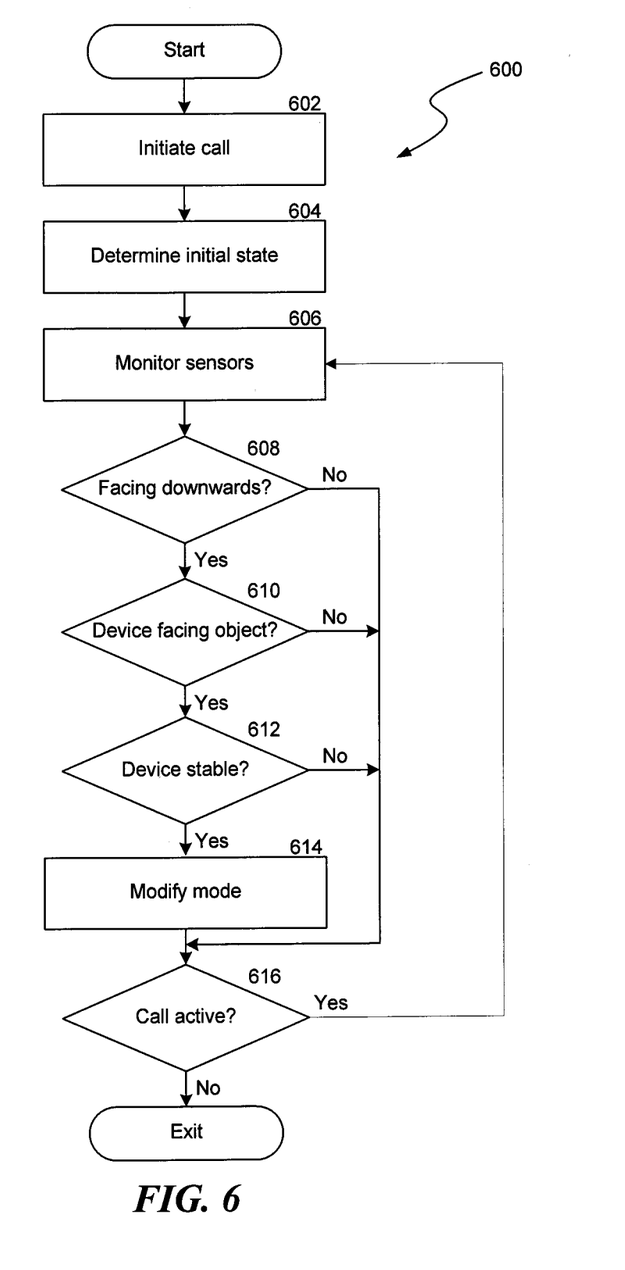
FIG. 6 illustrates a flowchart of a process for automatically modifying the operating mode of the mobile device during a telephone call based on sensor information.

FIG. 6 illustrates a flowchart of a process 600 for automatically modifying the operating mode of the mobile device during a telephone call based on sensor information. The system begins processing in block 602, where the mobile device initiates a new telephone call with a remote device. Initiating a new telephone call may include providing information to the network to request a connection to the remote mobile device. The system may monitor the mobile device according to the process 600 even before the connection to the remote device is completed, such as while the remote telephone is still ringing (referred to herein as an out-going ringing state).

After the call is initiated, processing proceeds to block 604, where the system determines the initial state of the mobile device. As in the process 500 of FIG. 5, this step may include determining the initial state by receiving data from one or more of the sensor components 405. Thus, the system may determine the initial position of the mobile device and initial incident light intensity. The system may also detect if there are objects already in proximity to the mobile device.

The system then proceeds to block 606, where it monitors the sensor components 405 to detect changes that would indicate a need for a change in operating mode. In general, the process 600 detects a similar set of changes to the process 500, including detecting whether the device has been moved to face downward (in decision block 608) and detecting whether the device has been moved to face an object (in decision block 610). The processing in these steps may be executed in a similar manner to the related steps in process 500. In addition, the system may also determine if the mobile device is stable (see decision block 612). This may include, for example, using the sensor components 405 to detect that the device does not change position or direction during a specified period of time. For example, the system may use the G sensor to measure acceleration at regular intervals and determine that the mobile device is stable if there is no acceleration during multiple successive measurements over the specified period of time. In particular, the system may be configured to determine that the mobile device is stable if three successive measurements taken 200 ms apart indicate that the device is not moving. Alternatively, the mobile device may use the light sensor to detect changes in incident light intensity indicating motion. For example, the system may determine that the device is stable if the incident light intensity varies by a small amount (e.g., less than 10%) over the specified period of time.

Processing then proceeds to block 614, where the system changes the operating mode of the mobile device. In this step, the system may change the operating mode of the device to enable the device to function as a speakerphone. This may include, for example, increasing the volume of a speaker in the mobile device, increasing the sensitivity of the microphone, or automatically changing the operating mode to a pre-configured speakerphone mode.

After changing the operating mode, or if the system has determined that the mode should not be changed, the system proceeds to decision block 616, where it determines if the telephone call is active. If the telephone call remains active, the system returns to block 606 to continue the monitoring process. If the telephone call has ended, the process 600 exits.

One skilled in the art will appreciate that the process 600 may be modified in various ways. For example, the process 600 may omit decision block 610, so that the system changes the operating mode if the mobile device is placed facing downward, regardless of whether the device is also facing an object. The process 600 may also be reversed if the mobile device is already operating in a speakerphone mode. In the reversed process, the system monitors the sensor components 405 in a similar loop, but is configured to exit the speakerphone mode if the device is moved to a position where it is not facing downward or is not facing an object. The system may also be modified to enable automatic mode-changing during selected types of telephone calls. For example, the system may be configured to automatically change modes only when the mobile device is participating in a call with multiple remote devices (e.g., a multi-party call, or a conference call).

Figure 7:
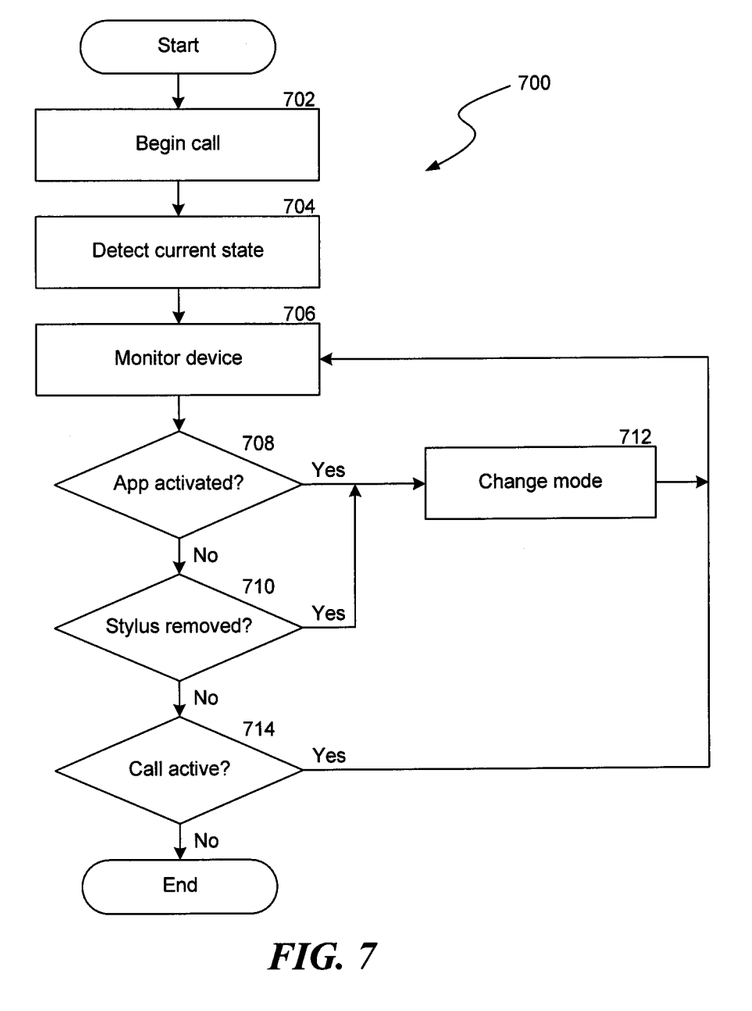
FIG. 7 illustrates a flowchart of a process for automatically modifying the operating mode of the mobile device during a telephone call based on a non-voice use of the device.

FIG. 7 illustrates a flowchart of a process 700 for automatically modifying the operating mode of the mobile device during a telephone call based on non-voice use of the device. The process 700 is used to change the operating mode (e.g., to speakerphone mode) when the user performs an action that requires taking the device away from the user's face during a telephone call, such as activating a notepad application on the mobile device. The system begins processing in block 702, where the mobile device begins a new telephone call with a remote device.

After the system detects that a new telephone call has been initiated, processing proceeds to block 704, where the system determines the current state of the mobile device. This step may include, for example, determining a list of applications currently active on the mobile device to determine the initial level of activity for the device. This step may also include detecting the initial physical configuration of the mobile device, such as determining if a pointer device (e.g., a stylus) is currently in a holder associated with the mobile device.

The system then proceeds to block 706, where it monitors the activity of the mobile device, such as the running applications and the status of the pointer device. As discussed above with reference to FIG. 4A, the system may monitor applications by polling the operating system or by receiving event notifications from the operating system when an application is activated or terminated. The system may determine if the pointer device is present using mechanical or electrical methods, such as the methods discussed above with reference to FIGS. 4B and 4C.

Processing then proceeds to decision block 708, where the system determines if a new application has been activated by the user. In some configurations, this test is met only when the system determines that an application from a predetermined set of applications is activated. For example, the system in block 708 may attempt to detect if a notepad or messaging application is activated but might ignore a contacts application or an Internet browser. If an application has not been activated, the system proceeds to decision block 710, where it determines if the pointer device has been removed from its holder. This may include, for example, determining if a pointer device, that was initially present, is not present at a later time during the call.

If the system detects a new application activated in decision block 708 or determines in block 710 that the pointer device was removed, processing proceeds to block 712, where the system changes the mode of the mobile device in response to the detected change. Based on the detected changes, the system may infer that the user will be using the mobile device for input purposes. Thus, the system may automatically change the operating mode from the standard telephone operating mode to the speakerphone mode in order to enable the user to continue the telephone call even while using the device for other purposes. After changing the operating mode, the system returns to block 706 to continue monitoring.

If the system does not detect any changes, processing proceeds to block 714, where it determines if the telephone call is active. If the telephone call remains active, the system returns to block 706 to continue monitoring the mobile device. If the telephone call has ended, the process 700 exits.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for changing an operating mode of a mobile device, the apparatus comprising:
   a housing having a form factor suitable for hand-held use, wherein the housing has a front face and a back face;
   a call notification component contained in the housing configured to provide an incoming call notification in response to an incoming telephone call from a wireless network, wherein the incoming call notification comprises an audible component;
   one or more sensor components contained in the housing configured to provide information associated with the physical environment of the mobile device,
      wherein the one or more sensor components comprises a G sensor configured to provide positioning information associated with a position of the mobile device;
   a memory contained in the housing; and
   a processor contained in the housing and coupled among the call notification component, the one or more sensor components, and the memory;
   wherein the processor is configured to execute various components, wherein the components comprise:
      a sensor monitor component configured to:
         monitor, while the telephone call is incoming, the one or more sensor components to detect an object placed in proximity to the front face of the mobile device, and
         determine based on a set of positioning information whether the orientation of the mobile device is in a face-up state, wherein the face-up state exists when the front face of the mobile device is facing in an upward direction; and
      a mode control component configured to change the operating mode of the mobile device based on the detection of the object placed in proximity to the front face of the mobile device and determining that the orientation of the mobile device is in the face-up state, wherein changing the operating mode of the mobile device comprises changing at least the level of the audible component of the incoming call notification prior to the conclusion of the incoming call notification.

2. The apparatus of claim 1, wherein the one or more sensor components comprises a proximity sensor and wherein detecting an object comprises using the proximity sensor to determine if the object is within a specified distance from the front face of the mobile device.

3. The apparatus of claim 1, wherein the one or more sensor components comprises a light sensor and detecting the object comprises:
   determining a first intensity level of light incident on the front face of the mobile device;
   determining a second intensity level of light incident on the front face of the mobile device;
   comparing the first intensity level of light incident on the front face of the mobile device and the second intensity level of light incident on the front face of the mobile device; and
   detecting the object based on the comparison of the first intensity level and the second intensity level.

4. The apparatus of claim 1, wherein changing at least the level of the audible component of the incoming call notification comprises changing the mobile device to a silent mode or a vibrate-only mode.

5. The apparatus of claim 1, wherein changing at least the level of the audible component of the incoming call notification comprises muting the audible component of the incoming call notification.

6. The apparatus of claim 1, wherein changing at least the level of the audible component of the incoming call notification comprises changing the mobile device to a speakerphone mode.

7. A method for changing an operating mode of a mobile device, the mobile device having at least a front face and a back face, the method comprising:
   receiving a notification of an incoming telephone call from a wireless network;
   providing an incoming call notification for the incoming telephone call to a user, wherein the incoming call notification comprises an audible component;
   while providing the incoming call notification to the user,
      detecting an object placed in proximity to the front face of the mobile device, and
      determining based on a set of positioning information whether the orientation of the mobile device is in a face-up state, wherein the face-up state exists when the front face of the mobile device is facing in an upward direction; and
   changing the operating mode of the mobile device based on detecting the object placed in proximity to the front face of the mobile device and determining that the orientation of the mobile device is in the face-up state, wherein changing the operating mode of the mobile device comprises changing at least the level of the audible component of the incoming call notification prior to the conclusion of the incoming call notification.

8. The method of claim 7, wherein detecting the object comprises using a proximity sensor to determine if the object is within a specified distance from the front face of the mobile device.

9. The method of claim 7, wherein detecting the object comprises:
   determining a first intensity level of light incident on the front face of the mobile device;
   determining a second intensity level of light incident on the front face of the mobile device;
   comparing the first intensity level of light incident on the front face of the mobile device and the second intensity level of light incident on the front face of the mobile device; and
   detecting an object based on the comparison of the first intensity level and the second intensity level.

10. The method of claim 7, wherein automatically changing the operating mode of the mobile device comprises changing the mobile device to a silent mode or a vibrate-only mode.

11. The method of claim 7, wherein automatically changing the operating mode of the mobile device comprises muting the audible component of the incoming call notification.

12. The method of claim 7, wherein changing at least the level of the audible component of the incoming call notification comprises changing the mobile device to a speakerphone mode.

13. A method for changing an operating mode of a mobile device that is configured to communicate using a wireless network, the method comprising:
receiving information from a user defining a set of high-priority mobile applications,
establishing a telephone call between the mobile device and a remote device;
during the telephone call between the mobile device and the remote device, monitoring the mobile device to detect the activation of a specified mobile application, wherein detecting the activation of the specified mobile application comprises detecting the activation of an application from the set of high-priority mobile applications; and
in response to activating the specified mobile application, determining whether the specified mobile application is found within a predetermined set of mobile applications, wherein each mobile application in the predetermined set of mobile applications is configured to directly change the operating mode of the mobile device; and
in response to finding the specified mobile application within the predetermined set of mobile applications, automatically changing the operating mode of the mobile device, wherein the operating mode is changed while the telephone call is in progress.

14. The method of claim 13, wherein automatically changing the operating mode of the mobile device comprises changing the mobile device to a speakerphone mode.

15. The method of claim 13, wherein the specified mobile application is a notepad application.

16. The method of claim 13, wherein monitoring the mobile device comprises:
polling an operating system of the mobile device to determine if the specified mobile application has been activated, or
receiving an event notification from the operating system of the mobile device, wherein the event notification comprises information specifying that the specified mobile application has been activated.

17. An apparatus for automatically changing an operating mode of a mobile device, the apparatus comprising:
a housing having a form factor suitable for hand-held use;
a memory contained in the housing,
wherein the memory stores information received from a user defining a set of high-priority mobile applications; and
a processor contained in the housing and coupled to the memory;
wherein the processor is configured to execute various components, wherein the components comprise:
a call monitor component configured to receive information associated with a telephone call between the mobile device and a remote device;
an application monitor component configured to:
monitor the mobile device to detect the activation of a specified mobile application during the telephone call between the mobile device and the remote device,
wherein detecting the activation of the specified mobile application comprises detecting the activation of an application form the set of high-priority mobile applications;
in response to activating the specified mobile application, determining whether the specified mobile application is found within a predetermined set of mobile applications, wherein each mobile application in the predetermined set of mobile applications is configured to directly change the operating mode of the mobile device; and
a mode control component configured to:
in response to finding the specified mobile application within the predetermined set of mobile applications, automatically change the operating mode of the mobile device, wherein the operating mode is changed while the telephone call is in progress.

18. The apparatus of claim 17, wherein automatically changing the operating mode of the mobile device comprises changing the mobile device to a speakerphone mode.

19. The apparatus of claim 17, wherein the specified application is a notepad application.

20. The apparatus of claim 17, wherein the application monitor component is configured to:
monitor the mobile device by polling an operating system on the mobile device to determine if the specified mobile application has been activated, or
receive an event notification from the operating system of the mobile device, wherein the event notification comprises information specifying that the specified mobile application has been activated.

21. An apparatus for changing an operating mode of a mobile device, the apparatus comprising:
a housing having a form factor suitable for hand-held use, wherein the housing has a front face and a back face;
a call notification component contained in the housing configured to provide an incoming call notification in response to an incoming telephone call from a wireless network, wherein the incoming call notification comprises an audible component;
one or more sensor components contained in the housing configured to provide information associated with the physical environment of the mobile device, wherein the one or more sensor components comprises a G sensor configured to provide positioning information associated with a position of the mobile device;
a memory contained in the housing; and
a processor contained in the housing and coupled among the call notification component, the one or more sensor components, and the memory;
wherein the processor is configured to execute various components, wherein the components comprise:
a sensor monitor component configured to:
monitor, while the telephone call is incoming, the one or more sensor components to:
detect an object placed in proximity to the front face of the mobile device,
determine a first set of positioning information from the G sensor at a first time,
determine a second set of positioning information from the G sensor at a second time, wherein the second time occurs after the first time;
compare the first set of positioning information and the second set of positioning information; and
determine based on the comparison whether the orientation of the mobile device has changed to a face-down state, wherein the face-down state exists when the front face of the mobile device is facing in a downward direction; and
a mode control component configured to change the operating mode of the mobile device based on the detection of the object placed in proximity to the front face of the mobile device and determining that the orientation of the mobile device is in the face-down state, wherein changing the operating mode of the mobile device comprises changing at least the level of the audible component of the incoming call notification prior to the conclusion of the incoming call notification.

22. The apparatus of claim 21, wherein the one or more sensor components comprises a proximity sensor and wherein detecting an object comprises using the proximity sensor to determine if the object is within a specified distance from the front face of the mobile device.

23. The apparatus of claim 21, wherein the one or more sensor components comprises a light sensor and detecting the object comprises:
   determining a first intensity level of light incident on the front face of the mobile device;
   determining a second intensity level of light incident on the front face of the mobile device;
   comparing the first intensity level of light incident on the front face of the mobile device and the second intensity level of light incident on the front face of the mobile device; and
   detecting the object based on the comparison of the first intensity level and the second intensity level.

24. The apparatus of claim 21, wherein changing at least the level of the audible component of the incoming call notification comprises changing the mobile device to a silent mode or a vibrate-only mode.

25. The apparatus of claim 21, wherein changing at least the level of the audible component of the incoming call notification comprises muting the audible component of the incoming call notification.

26. The apparatus of claim 21, wherein changing at least the level of the audible component of the incoming call notification comprises changing the mobile device to a speakerphone mode.

27. A method for changing an operating mode of a mobile device, the mobile device having at least a front face and a back face, the method comprising:
   receiving a notification of an incoming telephone call from a wireless network;
   providing an incoming call notification for the incoming telephone call to a user, wherein the incoming call notification comprises an audible component;
   while providing the incoming call notification to the user, detecting an object placed in proximity to the front face of the mobile device,
   determining a first set of positioning information associated with a position of the mobile device at a first time;
   determining a second set of positioning information associated with a position of the mobile device at a second time, wherein the second time occurs after the first time;
   comparing the first set of positioning information and the second set of positioning information; and
   determining based on the comparison whether the orientation of the mobile has changed to a face-down state, wherein a face-down state exists when the front face of the mobile device is facing in a downward direction, and
   changing the operating mode of the mobile device based on detecting the object placed in proximity to the front face of the mobile device and determining that the orientation of the mobile device is in the face-down state, wherein changing the operating mode of the mobile device comprises changing at least the level of the audible component of the incoming call notification prior to the conclusion of the incoming call notification.

28. The method of claim 27, wherein detecting the object comprises using a proximity sensor to determine if the object is within a specified distance from the front face of the mobile device.

29. The method of claim 27, wherein detecting the object comprises:
   determining a first intensity level of light incident on the front face of the mobile device;
   determining a second intensity level of light incident on the front face of the mobile device;
   comparing the first intensity level of light incident on the front face of the mobile device and the second intensity level of light incident on the front face of the mobile device; and
   detecting an object based on the comparison of the first intensity level and the second intensity level.

30. The method of claim 27, wherein automatically changing the operating mode of the mobile device comprises changing the mobile device to a silent mode or a vibrate-only mode.

31. The method of claim 27, wherein automatically changing the operating mode of the mobile device comprises muting the audible component of the incoming call notification.

32. The method of claim 27, wherein changing at least the level of the audible component of the incoming call notification comprises changing the mobile device to a speakerphone mode.

33. An apparatus for changing an operating mode of a mobile device, the apparatus comprising:
   a housing having a form factor suitable for hand-held use, wherein the housing has a front face and a back face;
   a call notification component contained in the housing configured to provide an incoming call notification in response to an incoming telephone call from a wireless network, wherein the incoming call notification comprises an audible component;
   one or more sensor components contained in the housing configured to provide information associated with the physical environment of the mobile device, wherein the one or more sensor components comprises a light sensor;
   a memory contained in the housing; and
   a processor contained in the housing and coupled among the call notification component, the one or more sensor components, and the memory;
   wherein the processor is configured to execute various components, wherein the components comprise:
      a sensor monitor component configured to monitor, while the telephone call is incoming, the one or more sensor components to detect an object placed in proximity to the front face of the mobile device,
         wherein the sensor monitor component is configured to detect the object by:
            determining a first intensity level of light incident on the front face of the mobile device;
            determining a second intensity level of light incident on the front face of the mobile device;
            comparing the first intensity level of light incident on the front face of the mobile device and the second intensity level of light incident on the front face of the mobile device; and
            detecting the object based on the comparison of the first intensity level and the second intensity level; and
      a mode control component configured to change the operating mode of the mobile device based on the detection of the object placed in proximity to the front face of the mobile device, wherein changing the operating mode of the mobile device comprises changing at least the level of the audible component of the incoming call notification prior to the conclusion of the incoming call notification.

34. The apparatus of claim 33, wherein changing at least the level of the audible component of the incoming call notification comprises changing the mobile device to a silent mode or a vibrate-only mode.

35. The apparatus of claim 33, wherein changing at least the level of the audible component of the incoming call notification comprises muting the audible component of the incoming call notification.

36. The apparatus of claim 33, wherein changing at least the level of the audible component of the incoming call notification comprises changing the mobile device to a speakerphone mode.

37. A method for changing an operating mode of a mobile device, the mobile device having at least a front face and a back face, the method comprising:
    receiving a notification of an incoming telephone call from a wireless network;
    providing an incoming call notification for the incoming telephone call to a user, wherein the incoming call notification comprises an audible component;
    while providing the incoming call notification to the user, detecting an object placed in proximity to the front face of the mobile device,
    wherein detecting the object comprises:
        determining a first intensity level of light incident on the front face of the mobile device,
        determining a second intensity level of light incident on the front face of the mobile device,
        comparing the first intensity level of light incident on the front face of the mobile device and the second intensity level of light incident on the front face of the mobile device, and
        detecting an object based on the comparison of the first intensity level and the second intensity level; and
    changing the operating mode of the mobile device based on detecting the object placed in proximity to the front face of the mobile device, wherein changing the operating mode of the mobile device comprises changing at least the level of the audible component of the incoming call notification prior to the conclusion of the incoming call notification.

38. The method of claim 37, wherein changing at least the level of the audible component of the incoming call notification comprises changing the mobile device to a silent mode or a vibrate-only mode.

39. The method of claim 37, wherein automatically changing the operating mode of the mobile device comprises muting the audible component of the incoming call notification.

40. The method of claim 37, wherein changing at least the level of the audible component of the incoming call notification comprises changing the mobile device to a speakerphone mode.

* * * * *